Nov. 18, 1924.
P. L. MARION
TIRE HANGER
Filed May 1, 1923
1,515,690
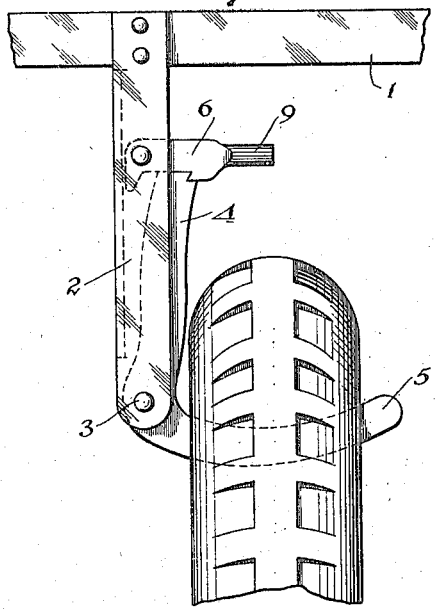
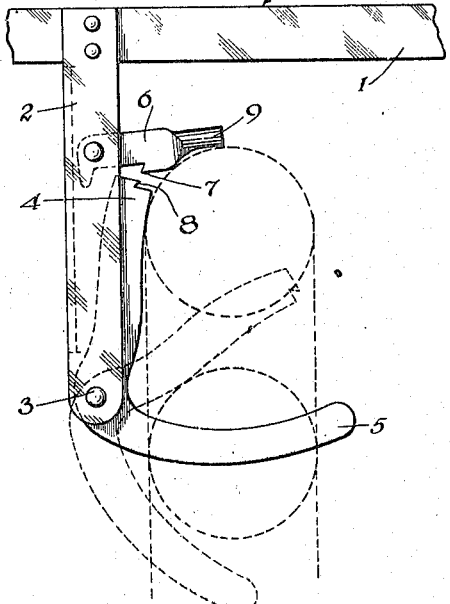
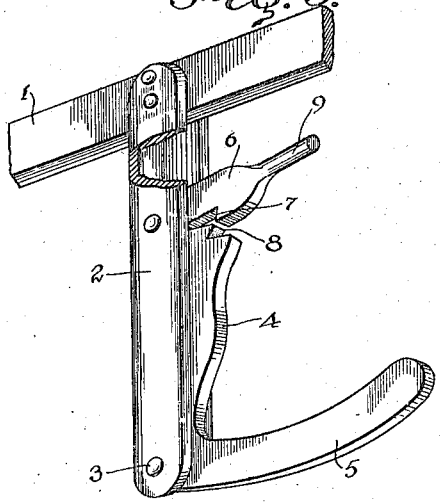
Inventor
Paul L. Marion.
By Eccleston & Eccleston,
Attorneys Patented Nov. 18, 1924.

1,515,690

UNITED STATES PATENT OFFICE.

PAUL L. MARION, OF SACRAMENTO, CALIFORNIA.

TIRE HANGER.

Application filed May 1, 1923. Serial No. 635,891.

*To all whom it may concern:*

Be it known that I, PAUL L. MARION, a citizen of the United States, residing at Sacramento, in the county of Sacramento and State of California, have invented certain new and useful Improvements in Tire Hangers, of which the following is a full, clear, and exact description.

My invention relates to an improved means for supporting rubber tires and similar annular objects, and has for its object to provide such a device which will support the tires in display position and entirely independent of each other, so that they may be removed and replaced with the least possible trouble.

A further object of the invention resides in the provision of a supporting hook and a latch for holding the hook in operative position, the latch being so disposed as to be automatically actuated by the tire as the latter is raised slightly above its normal hanging position.

A further object of the invention resides in the provision of such a device which is simple and reliable in operation and which is inexpensive in manufacture.

Other objects and advantages of the invention will be apparent from the following description when taken in connection with the accompanying drawings, in which:

Figure 1 is a side elevation of one of the hangers in operative position with a tire supported thereon.

Figure 2 is a view similar to Figure 1, showing in dotted lines the manner in which the hook is released by an upward movement of the tire, and Figure 3 is a perspective view of one of the hangers, with parts broken away.

Referring to the drawing more in detail, the numeral 1 indicates a rail of any type to which a series of the hangers may be applied. A bracket 2, substantially U-shaped in cross section, is secured to the rail 1 and depends therefrom. Pivotally mounted in the bracket 2 adjacent the lower end thereof, as indicated by numeral 3, is an L-shaped hook member comprising the integrally connected arms 4 and 5.

For the purpose of retaining the hook member in the supporting position I have provided a gravity-operated latch 6 which is pivoted within the bracket 2 and is provided with a nose 7 adapted to co-operate with a similar nose 8 formed on the upper end of the arm 4. An extension 9 is provided on the latch 6, in order that the latter may be operated by the tire when removing the same.

In use, the tire may be removed from its position on the hook, as indicated in Figure 1, by merely raising the tire to the upper dotted line position indicated in Figure 2. This movement of the tire disengages the latch 6 from the arm 4 of the hook member, permitting the latter to swing downwardly on its pivot 3, and consequently allowing the tire to be drawn downwardly without in any manner disturbing adjacent tires.

In applying a tire to the hook the same is raised into contact with the arm 4, thereby swinging the hook upwardly on its pivot, and a slight lateral pressure on the tire will cause the arm 4 to be brought under the gravity latch 6 which will immediately engage the nose 8 and lock the hook in the supporting position.

From the foregoing description it will be seen that I have provided an exceedingly simple tire hanger comprising only three elements which may be easily and cheaply manufactured; also that the tires may be suspended in compact relation and yet may be removed or replaced without in any way interfering with adjacent tires.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A tire hanger, including a support, a bracket connected thereto, an L-shaped hook member pivoted to the bracket at the vertex of the angle and having one arm extending substantially vertically when in operative position, and a gravity latch adapted to co-operate with the vertically extending arm of the L-shaped hook member.

2. A tire hanger, including a support, a bracket connected thereto, an L-shaped hook member pivoted to the bracket at the vertex of the angle, and having one arm extending substantially vertically when in operative position, a gravity latch adapted to cooperate with the vertically extending arm of the L-shaped hook member, said latch provided with an extension overhanging a substantial portion of the hook member when the latter is in operative position.

3. A tire hanger, including a support, a bracket connected thereto, an L-shaped hook member pivoted to the bracket at the vertex of the angle and having one arm extending substantially vertically when in operative position, a gravity latch adapted to cooperate with the vertically extending arm of the L-shaped hook member, said latch provided with a substantially vertically extending nose for cooperation with a portion of the vertically extending arm.

PAUL L. MARION.